United States Patent Office 3,492,137
Patented Jan. 27, 1970

3,492,137
SILICEOUS COMPOSITIONS
Ralph K. Iler, Wilmington, Del., assignor to E. I. du Pont de Nemours and Company, Wilmington, Del., a corporation of Delaware
No Drawing. Continuation-in-part of application Ser. No. 528,045, Feb. 17, 1966. This application Sept. 20, 1968, Ser. No. 761,293
Int. Cl. C01b 33/32; C09j 1/02
U.S. Cl. 106—74
7 Claims

ABSTRACT OF THE DISCLOSURE

A stable, aqueous sodium polysilicate containing 10 to 30% by weight silica and sodium oxide and having a silica to sodium oxide weight ratio of 4.2:1 to 6.0:1 is prepared by mixing colloidal amorphous silica with a sodium silicate solution and heating the mixture between 40° C. and 100° C.

CROSS REFERENCE TO RELATED APPLICATIONS

This application is a continuation-in-part of my co-pending application Ser. No. 528,045, filed Feb. 17, 1966, which application was a continuation-in-part of my then copending application Ser. No. 255,645, filed Feb. 1, 1963, now abandoned.

BACKGROUND OF THE INVENTION

This invention relates to stable, aqueous compositions having a silica to sodium oxide weight ratio of from 4.2:1 to 6:1 with 10 to 30% by weight solids, i.e., silica and sodium oxide, and to their preparation.

Heretofore, sodium silicates and silica-silicate systems with silica to sodium oxide weight ratios in the range of 4:1 to 6:1 are described as being very dilute, generally below 5% solids, or as being unstable and gelling in a matter of minutes or hours.

The present invention not only provides a method for preparing aqueous compositions of silica and sodium silicate containing from 10 to 30% solids and having a silica to sodium oxide ratio from 4.2:1 to 6:1, but also provides a composition which is stable against gelation and precipitation. The stable composition of this invention is particularly useful in that, when dried, it shows markedly superior water resistance and binding ability as compared to conventional silica-silicate dispersion.

It is well known that a fluid alkali metal silicate composion having an $SiO_2$/alkali metal oxide ratio greater than about 4:1 and a total solids concentration greater than about 10% cannot be obtained by dissolving alkali metal silicate glass of this $SiO_2$/alkali metal oxide ratio, in water, even under pressure. However, it is known that a sodium silicate composition having an $SiO_2/Na_2O$ ratio of greater than about 4:1 can be made by adding a small amount of an acid such as formic or acetic acid to neutralize part of the $Na_2O$ and convert it to a sodium salt, thus leaving a sodium silicate of higher $SiO_2/Na_2O$ ratio. However, when this is done with concentrated solutions, the viscosity becomes extremely high and, in fact, the mass solidifies and is no longer liquid.

It is also apparent to one skilled in the art that when a concentrated solution of sodium silicate is dialyzed, the alkali metal oxide in the form of alkali metal hydroxide such as sodium hydroxide, is removed more rapidly than the silicate ions, and thus it is possible to obtain dilute mixtures having an $SiO_2/Na_2O$ ratio greater than 4:1. But in this case also, when the mixture is concentrated, solidification occurs.

SUMMARY OF THE INVENTION

It is the essence of this invention that a stable, homogeneous aqueous composition having an $SiO_2$/sodium oxide ratio greater than about 4.2:1 but less than over 6:1, and containing no water insoluble, crystalline sodium polysilicates, can be made providing part of the silica is initially present in a colloidal amorphous state.

The colloidal amorphous silica dispersed in the sodium silicate is depolymerized by the sodium silicate to give a homogeneous liquid which is the product of this invention, by heating the dispersion between 40° C. and 100° C. for a suitable period of time. However, prolonged heating at 100° C. or at higher temperature, will induce the nucleation of insoluble sodium polysilicate of very fine crystallite size and thus the composition is converted to one similar to that known in the prior art which is solid. Such prior art materials have little utility as film-forming and bonding agents because they are inhomogeneous and unstable.

The composition of this invention has not heretofore been made available because it has not been obvious to those skilled in the art how to combine a strong solution of sodium silicate with a relatively concentrated solution of colloidal silica or colloidal silica particles. For example, if one attempts to add a solution of sodium silicate to a colloidal silica dispersion, immediate gelling or flocculation occurs. Also, even if one reverses the order of addition, which avoids gelling as taught by this invention, the mixture immediately obtained is heteregeneous and is readily discarded as useless.

DETAILED DESCRIPTION OF THE INVENTION

In the composition of the invention it is essential to employ a form of amorphous silica in which the ultimate silica particles are of colloidal size and not packed into dense aggregates. Commercial silica gels containing large densely packed aggregates, granultes or lumps of colloidal silica particles are not suitable for the process of this invention unless they can be processed to the desired characteristics. Also many of the natural finely divided silicas, such as diatomaceous earth, canont achieve the same effect when dispersed in sodium silicate solution having an $SiO_2$/sodium oxide ratio of less than 4.2:1. With most finely ground silicas, the dispersion made will slowly settle forming a cake and the composition is essentially heterogeneous in nature. Furthermore, such finely divided, but not colloidal amorphous silica reacts far more slowly with the alkali when the mixture is heated, than when the silica is in the truly colloidal state.

The colloidal amorphous silicas useful in preparing the compositions of the invention have a specific surface area greater than 50 square meters per gram and generally in the range of 50 to 800 m.$^2$/g. and preferably in the range of 100 to 500 m.$^2$/g. The specific surface area is determined by nitrogen adsorption according to the BET method. The ultimate particle size of the silica used is in the colloidal range, and is generally in the range of 5 to 50 millimicrons, preferably 5 to 25 millimicrons.

The useful colloidal amorphous silica can be in the form of silica sol having particles of 5 to 50 millimicrons in average diameter. Preferred silica sols are those having colloidal silica particle sizes ranging from 5 to 25 millimicrons. Thus, the silica sols of the desired particle size range described by M. F. Bechtold and O. E. Snyder in U.S. Patent 2,574,902; J. M. Rule in U.S. Patent 2,577,484; or G. B. Alexander in U.S. Patent 2,750,345 can be used.

With silica particles from 25 to 50 m$\mu$, a composition with ratios from 5:1 to 6:1 can be prepared. The preferred compositions have ratios from 4.2:1 to 5:1 and are preferably prepared from 10 to 25 m$\mu$ silica sols. The most preferred composition has a 4.6:1 ratio and is preferably prepared from a silica sol having a particle size of 15 m$\mu$. Compositions prepared from less than 10 m$\mu$ silica sols are more sensitive to gelation or precipitation and require more careful control of time and temperature during preparation.

However, it should be pointed out that certain very finely divided colloidal silica powders such as those made by the "fume process" made by burning a mixture of silicon tetrachloride and methane, have a sufficiently discrete, particulate structure that such powders can be dispersed in water by colloid milling to give a sol useful in this invention. It is also obvious that such a powder can also be colloid milled directly into a solution of sodium silicate to give the product of this invention by heating.

Very finely divided colloidal silica powders can also be obtained by treating certain silicate minerals such as clay or calcium silicate with acid, followed by suitable heat treatment in an alkaline medium. Similarly, finely divided colloidal silicas can be produced by precipitating silica from a solution of sodium silicate with carbon dioxide in the presence of a calcium salt and then removing the calcium with acid. Such precipitated silicas are commonly used as reinforcing fillers for elastomers, because they are extremely finely divided, and the ultimate particles are easily broken apart. Finely divided aerogels of silicas may be employed, such as those described by Kistler in U.S. Patents 2,093,454 and 2,249,767.

The finely divided colloidal silica powders useful in the composition of the invention are characterized by having specific surface areas as determined by nitrogen adsorption according to the BET method, of from 50 to 800 m.$^2$/g. and preferably 100 to 500 m.$^2$/g., and being further characterized by the fact that the aggregates of ultimate silica particles are generally less than 10 microns in diameter.

In some instances, colloidal silica powders of commerce may contain an appreciable proportion of unreactive silica. Accordingly, a proportionately greater weight of colloidal silica powder should be employed for admixture with the aqueous sodium silicate solution to provide sufficient silica to obtain a composition having an SiO$_2$/sodium oxide ratio of from 4.2:1 to 5:1 in solution. Subsequently, the unreacted silica may be separated by filtration or centrifugation.

In general, when using the finely divided colloidal silica powders, it is preferred to use amorphous silica powders in which at least half of the silica is in a finely divided colloidal state. These powders will react with the soluble sodium silicate and dissolve to give the desired SiO$_2$/Na$_2$O weight ratio.

Generally, the finely divided colloidal silica powders have the property of adsorbing alkali and, in effect, act as acidic materials. Since acidic materials tend to gel concentrated sodium silicate solutions, it is preferred to first neutralize the acidity of the colloidal silica powder with a free base or alkali prior to adding to the sodium silicate solution. This can be accomplished by stirring the powder in water with sufficient sodium hydroxide in solution to render the suspension strongly alkaline, i.e. a pH of about 10 to 12. This alkaline suspension may then be admixed with sodium silicate solution without undesirable thickening of the mixture. By avoiding the thickening, the homogenization of the mixture by stirring can be accomplished without difficulty. Usually less than 10% by weight of sodium hydroxide, based on the dry weight of the colloidal silica powder, is required to neutralize the acidity of the powder, and with most powders only from 1 to 5% by weight of alkali is needed.

Commercially available water soluble sodium silicates can be used in preparing the composition of the invention. These silicates have a weight ratio of silica to sodium oxide ranging from 1:1 to 4:1 and a concentration of silica and sodium oxide of about 30 to 45% by weight. The most preferred silicate is a 3.25:1 ratio sodium silicate solution containing 28.4% by weight silica and 8.7% by weight sodium oxide.

The compositions can be prepared by dispersing colloidal amorphous silica having an ultimate silica particle size within the range of 5 to 50 m$\mu$ in sodium silicate solution having a silica to sodium oxide weight ratio of from 1:1 to 4:1, and heating the mixture at a temperature between 40° C. and 100° C. for a time sufficient to make the mixture homogeneous.

Heating for longer periods of time or at higher temperatures than required to achieve homogeneity is harmful and must be avoided. Various crystalline sodium polysilicates are formed through excessive heating and they cause first the development of a gelatinous consistency and later separation of insoluble solids. Such inhomogeneous mixtures cannot be used, for example, to form clear air-dried films or strongly adhesive bonds characteristic of the homogeneous liquid product of this invention.

The dispersing of the silica sol and sodium silicate can be accomplished by admixing with vigorous agitation the necessary quantities of the silica sol and sodium silicate to give the desired ratio and solids content. Preferably the dispersing is accomplished by adding the colloidal silica to an agitated diluted sodium silicate solution to give the desired ratio and solids content.

After the dispersing step is accomplished, the mixture is heated at a temperature between 40° C. and the boiling point of the mixture. Since time is related to temperature in the process, the mixture is heated for a few days at 40° C. or as little as a few minutes at the boiling point. Thus the mixture may be held at reflux temperature for 5 to 45 minutes. The finer the ultimate particle size of the starting amorphous silica, the shorter the time and the lower the temperature required for homogenization.

An important aspect of the invention is that the temperature to which the mixture is heated should not exceed its boiling point at atmospheric pressure. When the temperature is above the boiling point water insoluble crystalline polysilicates are formed rapidly and the resulting compositions are unstable and lose their binding properties.

The temperature should be at least 40° C. since below this level the process becomes impracticable in that a very long period of time will be required.

The time required for heating varies for each final product obtained and is dependent upon the desired ratio and solids content of the final product, the particle size of the colloidal amorphous silica used as a reactant, the temperature and the method of dispersion. At the higher temperatures, less time will be required. The mixture should be heated until it is homogenous, that is, until it becomes transparent and liquid.

Generally, the smaller particle size, the shorter the heating time. The optimum heating time can be established by following the stability toward settling and following the viscosity in any particular composition. The time of heating is then selected at a given temperature, such as 75° C., as that time which gives a fluid from which no more than 5% by volume of sediment will settle at room temperature in one day, and which simultaneously has a minimum viscosity.

When refluxing is used, it is important that the reaction is not allowed to proceed too long, since the particles will continue to grow and the mixture will precipitate or gel. Regardless of the temperature employed, heating should be continued only until the mixture is homogeneous.

Consideration must also be given to the fact that precipitation will occur if the solids concentration is above 30% or if the silica to sodium oxide ratio is above 6:1.

When colloidal silica powder is employed instead of a silica sol, it is preferred to first neutralize the acidity of the powder as has been previously described. However, it will be noted that allowance must be made for the amount of sodium hydroxide that is first admixed with the aqueous suspension of powder, in maintaining the final silica to sodium oxide ratio within the ratio of 4.2:1 to 6:1. Instead of using sodium hydroxide to neutralize the acidity of the colloidal silica powder, another base that will remain compatible in the product may be employed, such as potassium hydroxide or tetramethylammonium hydroxide.

In any event, the amount of these bases employed, calculated as an equivalent quantity of sodium oxide, should not exceed more than about 10% by weight based on the silica powder that is used, and preferably an amount equivalent to less than 5% by weight of sodium oxide based on the silica powder is preferred.

Other strong bases may be used for neutralizing the acidity of the powder, but these must be selected so that they do not lead to subsequent precipitation of insoluble matter in the final product of the invention. For example, cetyl trimethylammonium hydroxide is a strong base, but should not be employed because it forms an insoluble silicate. For the same reason, calcium hydroxide or barium hydroxide, which are strongly basic, cannot be used.

In the process where the reactants are vigorously admixed and aged at 40° C., gelation or precipitation will occur immediately after mixing the reactants together. After one week of aging at 40° C. with agitation, a very clear, homogeneous solution results.

In the process where the reaction is carried out at reflux temperature by adding the colloidal amorphous silica to the vigorously agitated sodium silicate solution, precipitation does not occur unless the heating is carried on after the mixture has reached the homogeneous state, i.e., the state where the solids remain in suspension when the agitation is stopped.

When the reaction is carried out as just described, the added colloidal amorphous silica may cause local gelling of the sodium silicate solution if the latter is too concentrated. If necessary, the mixing can be carried out with the sodium silicate solution in a relatively dilute condition, for example containing 5% by weight of solids. After the mixture has reached the homogeneous state, the temperature may be lowered and the solution concentrated under vacuum or other conventional methods to give a concentrated product containing from 10 to 30% by weight solids, i.e., silica and sodium oxide.

The resulting composition formed by the above processes is a stable fluid which will not solidify or undergo appreciable viscosity change on standing at room temperature for several weeks or months. The compositions have a weight ratio of silica to alkali metal oxide from 4.2:1 to 6:1. Ratios of from 4.2:1 to 5:1 are preferred with 4.6:1 the most preferred ratio. The total solids contained in the composition is from 10 to about 30% by weight silica and sodium oxide. A preferred solids concentration is from 10 to 25% with the most preferred concentration being 20%. The compositions are further characterized in that they are free from water insoluble crystalline polysilicate compounds.

The composition of the invention is a clear, water white fluid whose viscosity at room temperature is between 10 and 100 cps. thus indicating that most of the silica present is in a well-depolymerized state. Depending upon the weight ratio of silica to sodium oxide and size of the initial silica particles, the silica in the product is from 40 to 65% by weght crystalloidal and the remainder is in the form of suspended particles which are barely visible with the electron microscope and are about 5 millimicrons or less in average diameter.

The percentage of silica in the crystalloidal form can be determined by the colorimetric method described in Iler U.S. Pat 2,668,149, i.e., the silicomolybdate method. In determining the amount of crystalloidal silica in the products of this invention, precaution must be taken that during the analytical procedures, no appreciable amount of colloidal silica depolymerizes or dissolves to the crystalloidal state. Thus, for example, if the product is diluted to less than 1% silica, for example, while in the alkaline state, the colloidal silica is converted rapidly even at room temperature to the crystalloidal form. This is avoided either by injecting a sample of the product directly into a large excess of molybdic acid reagent with violent agitation at the point of addition, or by diluting a sample by adding it suddenly to a violently agitated aqueous solution of dilute sulfuric acid, the latter being present in sufficient amount so that after the sample is added, the pH will still be less than about 2. In such acidic solution, the colloidal silica dissolves only very slowly and the crystalloidal silica will react when it is admixed with the molybdic acid reagent, before any appreciable amount of colloidal silica passes into the crystalloidal form.

When the weight ratio of silica to sodium oxide of the product is 4.2:1 about 45% by weight of the silica is crystalloidal and when the ratio is 6.1:1 about 62% is crystalloidal.

The product is marked by very surprising stability for products having over a 4:1 weight ratio of silica to sodium oxide. For example, a product whose viscosity is 10 cps. at the time of preparation has only a viscosity of 11 after one weeks aging at room temperature. Its viscosity after aging one week at 52° C. is only 12.5 cps.

The compositions of this invention have excellent adhesive properties. This was evaluated by gluing two pieces of unbleached kraft paper together, heating the glued side for 5 seconds with an iron and separating the two pieces. When the pieces of glued paper were pulled apart, fiber pull was observed before the glue bond could be broken.

These compositions can also be used where sodium silicate is presently being used, but a more water-resistant bond of film is desired. When used in ceramics, high temperature cements and the like, the higher ratio compositions of this invention increase the melting point and give a much better bond.

Alumina refractories bonded with silica may be prepared by moistening α-alumina powder with the liquid composition of this invention and molding the mass which is then dried and fired. The product of this invention is particularly useful as a binder and adhesive on asbestos products; it may be employed for gluing asbestos boards together, for impregnating asbestos paper and for admixture with asbestos fiber to make fireproof asbestos cements.

The product is compatible with colloidal silica sols and may be mixed with sols to give unusual film-forming compositions.

A further use of a composition of this invention having a ratio of about 4.4:1 to 4.6:1 $SiO_2/Na_2O$ is for the production of crystalline sodium polysilicate having ion exchange properties. This can be accomplished by heating the above composition for three weeks in a closed vessel at 100° C. The converted product is a suspension of sodium polysilicate and a sodium silicate solution of a $SiO_2/Na_2O$ ratio less than 3:1. This sodium polysilicate has been described by Leon J. McCulloch, J. Am. Chem. Soc., 74, 2453 (1952) and has the composition $Na_2O:8SiO_2:9H_2O$.

The invention will be better understood by reference to the following illustrative examples.

EXAMPLE I

A 4.6 ratio sodium silicate-colloidal silica mixture is prepared at 20% silica solids by shaking together in a one-pint bottle the following ingredients:

246.5 gr. Sodium silicate solution (water solution containing 28.4% $SiO_2$, 8.7% $Na_2O$)
153.3 gr. Distilled water.
100.2 gr. Aqueous dispersion of collodial silica ($SiO_2$ particles 15 millimicrons in diameter, containing 29.9% $SiO_2$ and having a ratio of $SiO_2/Na_2O$ of 96)

This mixture is made to contain 20% $SiO_2$ (70% of which is supplied by sodium silicate and 30% by the colloidal silica) and a $SiO_2/Na_2O$ ratio of 4.6, calculated as follows:

$$\frac{70 \text{ gr. } SiO_2 \text{ from silicate}}{0.284} = 246.5 \text{ gr. of sodium silicate solution which contains } 21.45 \text{ gr. } Na_2O$$

$$\frac{30 \text{ gr. } SiO_2 \text{ from colloidal silica}}{0.299} = 100.2 \text{ gr. colloidal silica dispersion which contains } 0.312 \text{ gr. } Na_2O$$

$$R = \text{Ratio of } SiO_2/Na_2O = \frac{100 \text{ gr. } SiO_2}{21.45 + 0.31 \text{ gr. } Na_2O} = 4.60$$

After blending the components by shaking, the product is a very turbid fluid. It is placed in an oven maintained at 52° C.; after two week's storage at 52° C., the sample is found to be perfectly clear and water white. The silica is present in the crystalloidal and colloidal form in about equal amounts and the colloidal particles are less than 5 millimicrons in average diameter as determined by light scattering techniques.

EXAMPLE II

A 1000 ml. 3-neck flask is equipped with a heating mantle, condenser, dropping funnel, thermometer, and a magnetic stirrer for agitation, and to this is added 373 gr. of sodium silicate solution as defined in Example I (3.5 ratio) and 267 gr. of water and the solution is brought to a mild reflux at 90 to 100° C. To this is added 160 gr. of an aqueous dispersion of colloidal silica as in Example I over a period of 15 minutes. The mixture is refluxed mildly for 45 minutes and then immediately cooled to give a water-white, completely fluid mixture. The reflux time is very carefully controlled, since gelation or precipitation will otherwise occur. The above mixture contains 20% solids of a 4.5 ratio sodium silicate-colloidal silica solution and is stable after one year at room temperature. The form of the silica is similar to that of Example I.

EXAMPLE III

Eight hundred eighty-one grams of 1 N sodium hydroxide is mixed with 1730 grams of 3.2:1 ratio sodium silicate containing 30% $SiO_2$ and 8.7% $Na_2O$. After stirring this mixture, 322.5 grams of a pure amorphous silica powder having aggregates approximately 10 microns in diameter and having a surface area of 130 m.²g. is added with continuous stirring.

This composition is heated on a hot plate at 90 to 95° C. for 2.5 hours, and a water-clear material is obtained which is fluid and stable. The resulting composition is shown by analysis to contain 16.93% $SiO_2$ and 0.605 mole of sodium oxide per liter. The mole ratio of $SiO_2$ to $Na_2O$ (which is approximately equal to the weight ratio) is 4.66.

EXAMPLE IV

One thousand grams of a 30% aqueous solution of colloidal silica, the ultimate colloidal particles of which have a specific surface area of 230 m.₂g., is mixed with 820 grams of a one molar sodium hydroxide solution. This gives a relatively thin gel. To this is added 1610 grams of a 30% 3.2:1 ratio sodium silicate containing 8.7 grams of sodium oxide per 100 grams of solution. One thousand grams of water is also added.

This mixture is heated and stirred at a temperature of about 90° C. for 2.5 hours. Initially, this solution is very viscous, but as heating and stirring progresses, it thins out and the turbidity originally present disappears. The final solution contains only a slight haze. This haze is eliminated by filtration through diatomaceous earth held on a coarse sintered glass crucible.

The resulting water-clear solution has a specific gravity of 1.22 and a percent solids of 24.82. Titration of the sodium hydroxide content with one molar HCl indicates that it contains 4.1% $Na_2O$. By difference from the total solids concentration, the percent silica is 20.7, and the ratio of $SiO_2$ to $Na_2O$ is 5.02. About 55% by weight of the silica present is in the crystalloidal form and the remainder is present as particles less than 5 millimicrons in diameter.

This composition can be mixed in any prooprtions with any particle size of colloidal silica to form stable, concentrated, higher ratio compositions. These compositions are very useful for film-forming purposes, as illustrated in the following:

One hundred grams of a 54% $SiO_2$ aqueous solution of discrete, dense colloidal particles 100 millimicrons in diameter is diluted with 233 cc. of distilled water and adjusted to a pH of 10 with concentrated ammonium hydroxide. This is mixed with 298.9 grams of a 15.7% $SiO_2$ solution of discrete, spherical, dense, 7 millimicron silica particles. While stirring this mixture at top speed in an homogenizer 185 grams of the 5:1 ratio sodium silicate is added and the resulting composition is cast as a film on a black glass plate. The film is first air-dried after casting, and then heated for ½ hour at 150° C. in an air oven. This gives a water-clear film which is exceedingly hard and water-resistant.

I claim:
1. An aqueous sodium silicate solution characterized by a concentration of 10 to 30% by weight of silica and sodium oxide, a silica to sodium oxide weight ratio of from about 4.2:1 to 6:1 and 40 to 65% by weight of the silica present in the crystalloidal form and the remainder being present as suspended particles less than 5 millimicrons in average diameter.

2. A stable aqueous sodium silicate solution as defined in claim 1 which is transparent and free from water insoluble crystalline sodium polysilicates.

3. The solution of claim 1 having a silica to sodium oxide weight ratio of from 4.2:1 to 5:1.

4. A process for preparing an aqueous sodium silicate solution having a concentration of 10 to 30% by weight of silica and sodium oxide and a silica to sodium oxide weight ratio of from about 4.2:1 to 6:1 comprising dispersing an amount to obtain a silica to sodium oxide weight ratio of from about 4.2:1 to 6:1, of colloidal amorphous silica having a specific surface area of from 50 to 800 square meters per gram of silica, with an agitated aqueous sodium silicate solution having a silica to sodium oxide weight ratio of from 1:1 to 4:1, and heating the mixture at a temperature between 40° C. and the boiling point of the mixture at atmospheric pressure for a time sufficient to make said mixture homogeneous and 40 to 65% by weight of the silica present in the crystalloidal form and the remainder as suspended particles less than 5 millimicrons in average diameter.

5. A process as set forth in claim 4 wherein said colloidal amorphous silica is mixed with a solution of free base and then mixed with said aqueous sodium silicate solution and heated.

6. A process as set forth in claim 4 wherein the colloidal amorphous silica has a specific surface of from 100 to 500 m.²/g.

7. A process for preparing an aqueous sodium silicate solution having a concentration of 10 to 30% by weight of silica and sodium oxide and a silica to sodium oxide weight ratio of from about 4.2:1 to 6:1 comprising dispersing an aqueous silica sol having a colloidal silica particle size within the range of 5 to 50 millimicrons in an agitated aqueous sodium silicate solution having a silica to sodium oxide weight ratio of from 1:1 to 4:1 and heating the mixture at a temperature between 40° C. and 100° C. for a time sufficient to obtain as the resultant product a homogeneous aqueous composition wherein 40 to 65% by weight of the silica present is in the crystalloidal form and the remainder as suspended particles less than 5 millimicrons in average diameter.

References Cited

FOREIGN PATENTS 537,873   3/1957   Canada.

JAMES E. POER, Primary Examiner

U.S. Cl. X.R.

106—84